(12) United States Patent
Forsberg et al.

(10) Patent No.: US 10,742,142 B2
(45) Date of Patent: Aug. 11, 2020

(54) CONTROLLING MOTOR MOVEMENT (71) Applicant: ASSA ABLOY AB, Stockholm (SE)

(72) Inventors: Tomas Forsberg, Svalöv (SE); Maciej Jurczak, Skawina (PL); Wojciech Koczwara, Sosnowiec (PL); Tomasz Piwowarczyk, Cracow (PL)

(73) Assignee: ASSA ABLOY AB (SE)

( * ) Notice: Subject to any disclaimer, the term of this patent is extended or adjusted under 35 U.S.C. 154(b) by 0 days.

(21) Appl. No.: 16/472,319

(22) PCT Filed: Dec. 15, 2017

(86) PCT No.: PCT/EP2017/083110
§ 371 (c)(1),
(2) Date: Jun. 21, 2019

(87) PCT Pub. No.: WO2018/114705
PCT Pub. Date: Jun. 28, 2018

(65) Prior Publication Data
US 2019/0379308 A1 Dec. 12, 2019

(30) Foreign Application Priority Data
Dec. 22, 2016 (EP) .................................... 16206263

(51) Int. Cl.
*H02P 6/18* (2016.01)
*H02P 6/182* (2016.01)
(Continued)

(52) U.S. Cl.
CPC .......... *H02P 6/182* (2013.01); *E05B 47/0012* (2013.01); *H02P 6/06* (2013.01); *H02P 6/17* (2016.02); *E05B 2047/0048* (2013.01)

(58) Field of Classification Search
CPC .................................. H02P 6/182; H02P 6/17
(Continued)

(56) References Cited

U.S. PATENT DOCUMENTS 4,558,259 A * 12/1985 Craig ...................... B60Q 1/05
307/10.8
2003/0100266 A1 5/2003 Wiemeyer et al.
(Continued)

FOREIGN PATENT DOCUMENTS

WO    WO 2008/101928    8/2008

OTHER PUBLICATIONS

International Search Report and Written Opinion for International (PCT) Patent Application No. PCT/EP2017/083110, dated Mar. 28, 2018, 8 pages.

*Primary Examiner* — Erick D Glass
(74) *Attorney, Agent, or Firm* — Sheridan Ross P.C.

(57) ABSTRACT

It is presented a motor controller configured to control movement of a motor to a mechanical end position. The motor controller comprises: a motor output configured to control an amount of energy being supplied to the motor; a motor input configured to measure a back electromotive force, EMF, voltage over the motor; and a control unit being configured to control the amount of energy being supplied on the motor output based on back EMF measurements from the motor input when the motor output is in a state of not supplying energy to the motor wherein the control unit is configured to detect an end position of the motor based on changes of back EMF measurements.

16 Claims, 3 Drawing Sheets

(51) Int. Cl.
   *H02P 6/17*     (2016.01)
   *E05B 47/00*    (2006.01)
   *H02P 6/06*     (2006.01)

(58) Field of Classification Search
   USPC .................................................. 318/400.34
   See application file for complete search history.

(56) References Cited

U.S. PATENT DOCUMENTS

2004/0108829 A1* 6/2004 Betts ........................ H02P 8/22
                                                    318/696
2005/0127861 A1  6/2005 McMillan et al.
2011/0147606 A1* 6/2011 Bragagna ............. G02B 26/105
                                                    250/396 R

* cited by examiner

CONTROLLING MOTOR MOVEMENT

CROSS REFERENCE TO RELATED APPLICATIONS

This application is a national stage application under 35 U.S.C. 371 and claims the benefit of PCT Application No. PCT/EP2017/083110 having an international filing date of 15 Dec. 2017, which designated the United States, which PCT application claimed the benefit of European Patent Application No. 16206263.2 filed 22 Dec. 2016, the disclosure of each of which are incorporated herein by reference.

TECHNICAL FIELD

The invention relates to controlling motor movement. In particular, the invention is related to control a motor based on a change of back EMF (electromotive force) measurements.

BACKGROUND

Electric motors are provided for a plethora of different use scenarios. One such scenario is a rotational movement of a motor to a mechanical end position. This scenario can e.g. be applicable in electronic locks, where control logic should be able to control the state of a lock to be either unlocked or locked.

When controlling a motor to a mechanical end position, a DC (Direct Current) motor can be used. A DC motor can be powered by mains power, battery power or otherwise stored electric power, e.g. from energy harvesting of mechanical motion.

Traditional motor control to reach a mechanical end position is to provide a preconfigured amount of energy to the motor which is sufficient to reach the end position. However, this energy can be excessive at early stages of the lifetime of the application, whereby more energy than needed is supplied. Excessive energy may also stress mechanical components or cause increased bumping, for which purpose additional mechanical components are added, thus increasing cost and space requirements.

WO 2008/101928A1 discloses a lock device adapted to unlock a lock by transferring a lock catch from a locking position to a releasing position. The device has an electric motor mechanically connected to an axle by means of at least one transmission means, and rotation of said axle actuates the lock catch. The device is characterized in that it comprises means for monitoring the current consumed by the electric motor. At the end the lock catch reaches its permanent stop position, which results in a rapid increase in current consumption. In order to measure the current, a resistor is connected in series with the motor. This causes some energy loss due to the voltage drop across the resistor.

US 2003/0100266 A1 discloses an access control system, a method and system for conserving battery life comprising an electronic control processor in a motor-driven locking subsystem for measuring samples of back electromotive force from a DC motor within the motor-driven locking subsystem. The samples of the back electromotive force are summed by the electronic control processor to form a comparison parameter value. The comparison parameter value is compared to a pre-determined threshold value to form a decision parameter. An action is taken by the electronic control processor in the motor-driven locking subsystem based on the decision parameter. This action comprises one of commanding the battery source in the motor-driven locking subsystem to increase the voltage level to the motor, generating a fail signal, or detecting and indicating a lock or unlock condition.

US2005/0127861 A1 discloses an actuator having an electric motor that generates a back emf. The actuator also includes a control system for controlling the speed of the electric motor. The control system includes a controller and circuitry for allowing the controller to sample the back emf of the motor. The controller uses the sampled back emf as feedback representative of motor speed for use in controlling the speed of the motor.

SUMMARY

It is an object to improve motor control for detecting a mechanical end position.

According to a first aspect, it is presented a motor controller configured to control movement of a motor to a mechanical end position. The motor controller comprises: a motor output configured to control an amount of energy being supplied to the motor; a motor input configured to measure a back electromotive force, EMF, voltage over the motor; and a control unit being configured to control the amount of energy being supplied on the motor output based on back EMF measurements from the motor input when the motor output is in a state of not supplying energy to the motor wherein the control unit is configured to detect an end position of the motor based on changes of back EMF measurements.

The change of back EMF indicates acceleration/deceleration. Hence, when the motor decelerates due to reaching the end position, this is detected and no more energy is supplied to the motor. This detection does not depend on the starting position of the motor or integration of speed samples which can be unreliable.

The control unit may be configured to detect the end position of the motor when the back EMF measurements reverse in polarity.

The control unit may be configured to alternately add energy and measure back EMF until the end position is detected.

The control unit may be configured to estimate a speed of the motor based on the back EMF measurements.

The control unit may be configured to estimate the speed also based on a temperature.

The control unit may be configured to supply more energy using the motor output when the detected speed is less than a reference speed.

The control unit may be configured to supply less than a reference amount of energy using the motor output when the detected speed is greater than a reference speed.

The control unit may be configured to estimate a motor position by integrating the speed over time.

The control unit may be configured to detect an end position of the motor when the back EMF changes at a rate more than a first threshold amount.

The motor output may be configured to control the amount of energy being supplied to the motor using pulses of electrical energy.

The control unit may be configured to detect that the motor is stuck when the back EMF is lower than a second threshold level.

According to a second aspect, it is a motor assembly comprising the motor controller according to the first aspect and a motor controlled by the motor controller.

According to a third aspect, it is presented an electronic lock comprising the motor assembly according to the second aspect.

According to a fourth aspect, it is presented a method for controlling movement of a motor to a mechanical end position. The method is performed in a motor controller and comprises the steps of: providing signals on a motor output of the motor controller to control energy supplied to the motor; measuring a back electromotive force, EMF, voltage over the motor; and controlling the amount of energy being supplied on the motor output based on back EMF measurements from the motor input when the motor output is in a state of not supplying energy to the motor, which comprises detecting an end position of the motor based on changes of back EMF measurements.

According to a fifth aspect, it is presented a computer program for controlling movement of a motor to a mechanical end position. The computer program comprises computer program code which, when run on a motor controller causes the motor controller to: provide signals on a motor output of the motor controller to control energy supplied to the motor; measure a back electromotive force, EMF, voltage over the motor; and control the amount of energy being supplied on the motor output based on back EMF measurements from the motor input when the motor output is in a state of not supplying energy to the motor, which comprises detecting an end position of the motor based on changes of back EMF measurements.

According to a sixth aspect, it is presented a computer program product comprising a computer program according to the fifth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
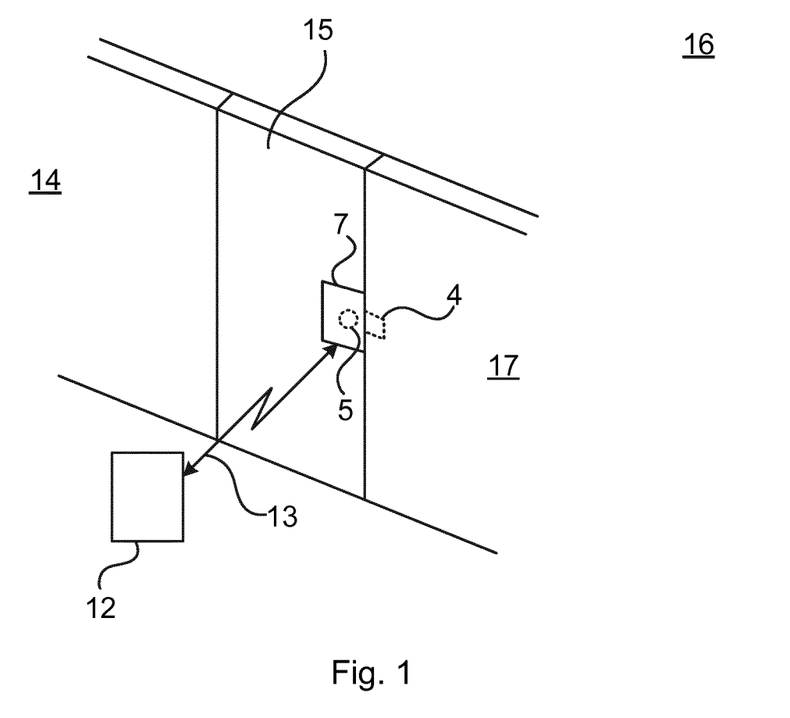
FIG. 1 is a schematic diagram showing an environment in which embodiments presented herein can be applied.

FIG. 1 is a schematic diagram showing an environment in which embodiments presented herein can be applied. Access to a physical space 16 is restricted by a physical barrier 15 which is selectively unlockable. The physical barrier 15 stands between the restricted physical space 16 and an accessible physical space 14. Note that the accessible physical space 14 can be a restricted physical space in itself, but in relation to this physical barrier 15, the accessible physical space 14 is accessible. The barrier 15 can be a door, gate, hatch, cabinet door, drawer, window, etc. In order to control access to the physical space 16, by selectively unlocking the barrier 15, an electronic lock 7 is provided. The electronic lock 7 performs access control and selectively commands a motor assembly 5 to allow mechanical opening of the barrier 15, e.g. by setting a bolt 4 from a blocking state to an open state. Alternatively, a handle/key operates the latch of the lock but only if a blocking element controlled by the motor is positioned to allow the operation.

The electronic lock 7 can be provided in the barrier 15 itself (as shown) or in the structure 17 surrounding the barrier 15 (not shown). The electronic lock 7 is controllable to be in a locked state or in an unlocked state.

The electronic lock 7 can communicate with a portable key device 12 over a wireless interface 13. The portable key device 12 is any suitable device portable by a user and which can be used for authentication over the wireless or contact based interface 3. The portable key device 12 is typically carried or worn by the user and may be implemented as a mechanical key with added electronics, mobile phone, smartphone, key fob, wearable device, smart phone case, RFID (Radio Frequency Identification) card, etc. Using wireless communication, the authenticity of the portable key device 12 can be checked in an access control procedure, e.g. using a challenge and response scheme, after which the electronic lock 7 grants or denies access. Alternatively, the electronic lock 7 communicates with the portable key device 12 over a wired interface (not shown), e.g. using a serial interface (e.g. RS485, RS232), Universal Serial Bus (USB), Ethernet, or even an electric connection, e.g. provided when the key mechanically operates the latch in a lock with blocking element mechanism, whereby the key is physically connected to the lock to allow transfer of access data.

When the access control procedure results in granted access, the electronic lock 7 sends an unlock signal to the motor assembly 5, whereby the electronic lock 7 is set in an unlocked state.

When the electronic lock 7 is in an unlocked state, barrier 15 can be opened using a handle 51, and when the electronic lock 7 is in a locked state, the barrier 15 cannot be opened. In this way, access to a restricted physical space 16 can be controlled by the electronic lock 7.

Figure 2:
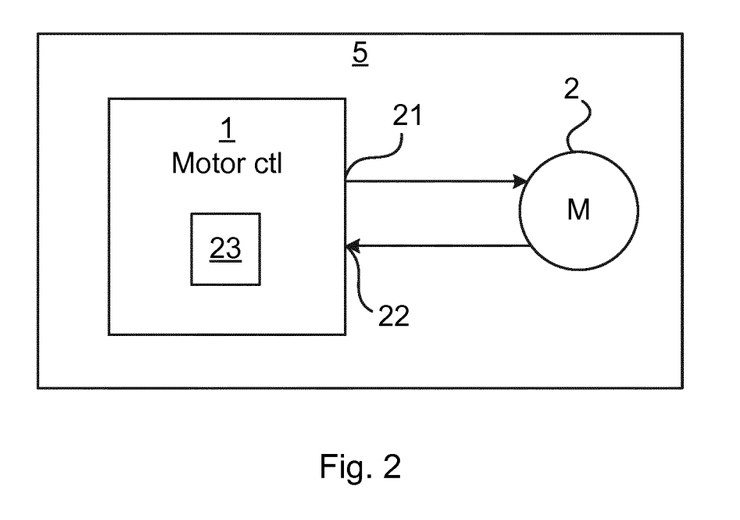
FIG. 2 is a schematic diagram illustrating the motor assembly of FIG. 1.

FIG. 2 is a schematic diagram illustrating the motor assembly 5 of FIG. 1. The motor assembly comprises a motor 2 and a motor controller 1. The motor 2 is an electrical motor and can e.g. be a DC (Direct Current) motor.

Figure 3A:
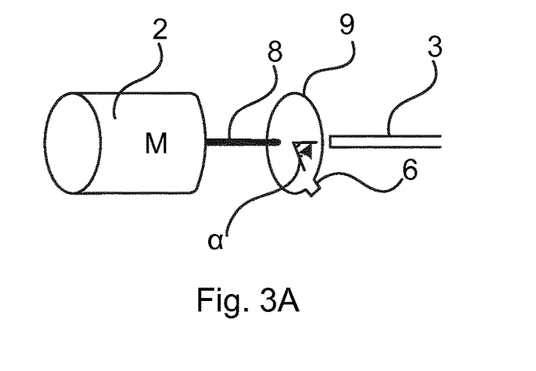
FIGS. 3A-B are schematic drawings illustrating how the motor of FIG. 2 can be controlled to be in a mechanical end position.
Figure 3B:
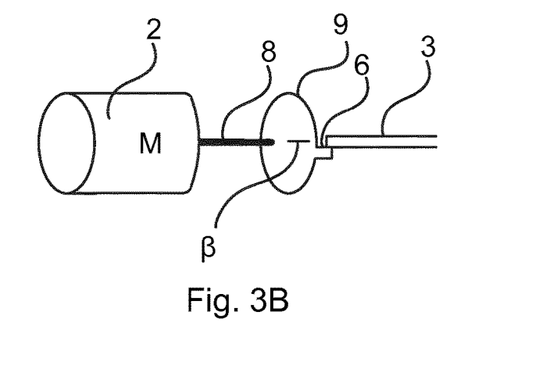

As shown in FIGS. 3A-B and described below, the motor 2 can be controlled to rotate to an end position, e.g. when the electronic lock of FIG. 1 is to transition from a locked state to an unlocked state or vice versa.

The motor controller 1 comprises a motor output 21 which is configured to control an amount of energy being supplied to the motor 2. Moreover, the motor controller 1 comprises a motor input 22 which is configured to measure a back electromotive force, EMF, voltage over the motor 2. It is to be noted that the motor output 21 and the motor input 22 can share some or all physical connections, in which case measurements on the motor input 22 are only obtained when no signals on the motor output 21 are supplied.

The motor controller 1 further comprises a control unit 23, which can be implemented using a processor (e.g. microcontroller, central processing unit (CPU), etc.) and software instructions such as a computer program executing in the processor. Alternatively or additionally, the control unit 23 is implemented using hardware logic, such as any one or more of an ASIC (Application Specific Integrated Circuit), an FPGA (Field Programmable Gate Array), or discrete logical circuits.

The control unit is configured to control the amount of energy being supplied on the motor output 21 based on a change of back EMF measurements obtained using the motor input 22 when the motor output 21 is in a state of not supplying energy to the motor 2, i.e. when the motor 2 is coasting. This is described in more detail below with reference to FIG. 4. As the motor current is partly resistive and partly indicating motor movement, it is much easier to measure EMF voltage than current.

FIGS. 3A-B are schematic drawings illustrating how the motor 2 of FIG. 2 can be controlled to be in a mechanical end position. Looking first to FIG. 3A, the motor 2 controls the rotation of a drive axle 8. The drive axle 8 is fixedly mounted to a rotating member 9 comprising a protrusion 6. A fixedly mounted mechanical stopper 3 is provided. In FIG. 3A, the protrusion 6 is at an angle $\alpha$ from the mechanical stopper 3. When the motor 2 is controlled to rotate, the motor here rotates its drive axle 8 in a clockwise direction, with the protrusion approaching the mechanical stopper 3.

In FIG. 3B, the drive axle 8 and the rotating member 9 have been rotated to an extent that the protrusion 6 comes in contact with the mechanical stopper 3. Hence, in FIG. 3B, the motor is at a mechanical end position. The protrusion is now at an angle $\beta$ (being zero degrees) from the mechanical stopper.

While FIGS. 3A-B only show a single mechanical stopper 3, an additional mechanical stopper is optionally supplied. The two mechanical stoppers can then e.g. correspond to an unlocked state and a locked state, respectively, when the motor 2 is implemented as part of an electronic lock.

Figure 4:
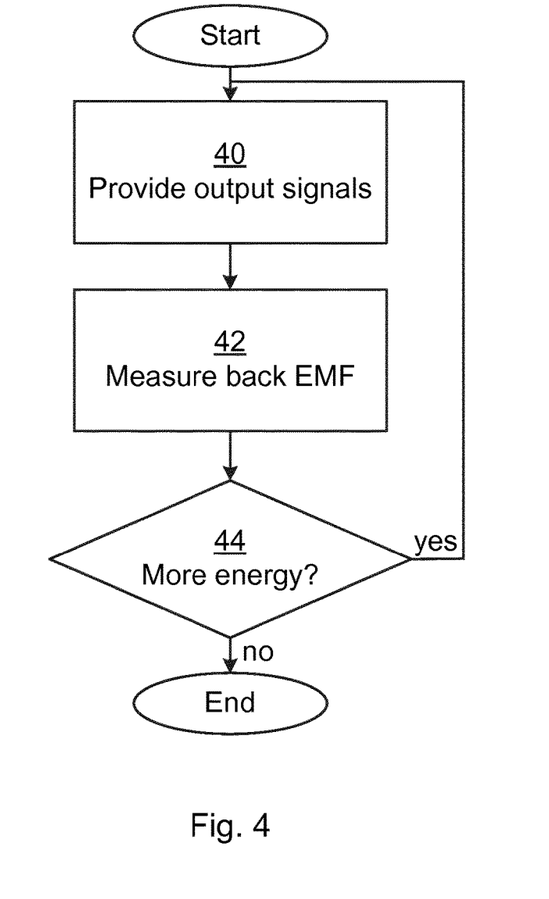
FIG. 4 is a flow chart illustrating a method for controlling movement of the motor to a mechanical end position.

FIG. 4 is a flow chart illustrating a method for controlling movement of the motor 2 to a mechanical end position. The method is performed in the motor controller.

In a provide output signals step 40, signals are provided on the motor output of the motor controller to control energy supplied to the motor. A certain amount energy is applied, e.g. using a pulse or pulse train. When the supplied voltage is higher than a rated motor voltage, the pulse train with a certain duty cycle can be employed which, using the inductance of the motor as low pass filter, provides a reduced voltage which is within the rating.

In a measure back EMF step 42, the back EMF voltage over the motor is measured, using the motor input. The motor normally continues to rotate at the same speed, after the controller stops to supply energy, due to the moment of inertia and the energy that was supplied. Hence the EMF voltage measured, as the motor starts to act as a generator instead, represents the speed and direction of the rotation. As described above, the motor input can be the same physical contacts that are used for the motor output, only used at a different time.

In a conditional more energy step 44, the motor controller determines whether to supply more energy to the motor based on back EMF measurements from the motor input when the motor output is in a state of not supplying energy to the motor, i.e. when the motor is coasting. This comprises detecting an end position of the motor based on changes of back EMF measurements. For instance, when the back EMF measurement change is greater than a threshold, this is interpreted as having reached the end position. The comparison can be a comparison of magnitudes or optionally also comprising a sign. When the comparison comprises a sign, it can be ensured that the change in velocity is due to a deceleration.

The change of back EMF indicates acceleration/deceleration. Hence, when the motor decelerates due to reaching the end position, this is detected and no more energy is supplied to the motor. Compared to a solution where back EMF samples are summed to derive a covered rotational distance, this detection does not depend on the starting position of the motor. Moreover, this solution does not depend on integration of speed samples which can be unreliable, leading to a required margin of error needed to assume that an end position has been reached.

In one embodiment, the speed of the motor is first estimated based on the back EMF measurements. This works since, when coasting, the motor acts as a generator, where the back EMF is indicative of the speed and direction of rotation. For instance, the speed can be estimated under the assumption that the speed is proportional to the back EMF. Optionally, temperature is also considered when determining speed. This may be beneficial since the relationship between back EMF and speed depends on temperature and the temperature can vary based on ambient temperature and/or motor load. The speed is compared with a reference speed (or reference speed range) and when the speed is too low, it is determined that more energy is needed. It is to be noted that the reference speed may be preconfigured or dynamic (depending e.g. on temperature, component wear, estimated motor position, prior events such as bumping). For instance, a high reference speed can be used initially to quickly come to the end position. Towards the end of the movement when bumping can be expected, the speed reference is lowered to reduce the bumping effect. The speed reduction can be greater when significant bumping was detected in the previous iteration.

The position of the motor (between a starting position and end position) can be obtained by integrating the speed over time. The starting position can be assured by other means. For instance, there can be a mechanical reset lever which is used to push the motor to a known 'closed' position when a key is pulled out of the electronic lock comprising the motor. Optionally, the position determination takes into account an estimated motor wear based on a number of prior cycles which have been performed. Additionally or alternative motor characteristics (derived from historical open/close iterations) are also used in the position determination.

Optionally, when the speed is greater than the reference speed (of reference speed range), the motor controller supplies less than a reference amount of energy in the next energy pulse. In other words, the method then proceeds to step 40, but provides less energy to the motor than it would if the speed were to be normal or too low.

Alternatively or additionally, the determination of whether to supply more energy is based on detecting whether the end position is reached, based on the back EMF measurements. In one embodiment, the motor controller evaluates whether the end position is reached by detecting when the back EMF changes at a rate more than a first threshold amount, i.e. the time derivative of the back EMF is greater than the first threshold amount. Since the back EMF is indicative of speed, the time derivative of the back EMF is indicative of acceleration (or deceleration). In one embodiment, the motor controller evaluates whether the end position is reached by detecting when the back EMF measurements reverse in polarity, due to a bumping resulting in a change of direction of rotation. This is a very robust way of detecting the end position. A polarity reversal is simple to measure. When end position is used in the determination, if the end position has not been reached, more energy can be supplied.

Optionally, the back EMF is used to detect that the motor is stuck when the back EMF is lower than a second threshold level. Also, history can be used in that the speed of the motor never increased in the current iteration of the motor control, i.e. the motor never moved. In one embodiment, there is a cushion at the end position which results in a softer deceleration (detected according to the above) in normal operation to end position, compared to if the motor gets stuck. When the motor is stuck, this can trigger additional energy to be supplied to the motor to release the motor. If this does not work, a message can be transmitted to maintenance so that an operator can come to the motor (e.g. comprised in a lock) and repair it.

The determination of whether to supply more energy or not is based on the latest measurement and/or historic data. If more energy is to be supplied, the method returns to the provide output signals step 40. Otherwise, the method ends.

Using the described method, the back EMF provides a feedback loop of the motor control. This gives great possibility of motor control without the need for additional sensors, etc. which would add complexity, space and cost to the motor controller.

Optionally, an amount of energy to be supplied to the motor on a next movement to the end position (i.e. the next occasion when a corresponding movement is performed) is adjusted based on the size of a back EMF measurement after the polarity has been reversed. For instance, if the back EMF measurement after the polarity reversal is large, this indicates that too much energy is supplied to the motor and significant bumping against the mechanical end position occurs. This implies that the amount of energy is reduced for the next iteration of the corresponding movement.

Using the feedback loop of the methods presented in FIG. 4, the energy amount supplied to the motor is adjusted based on the current characteristics of the motor. This prevents that an excessive amount of energy is supplied to the motor to ensure that the end position is always reached. Hence, energy is conserved and wear of mechanical components is reduced due to reduced bumping at the mechanical end position. Also, the motor assembly becomes more tolerant to variations in characteristics due to manufacturing variations. Moreover, the motor assembly becomes more tolerant to temperature variations.

Figure 5:
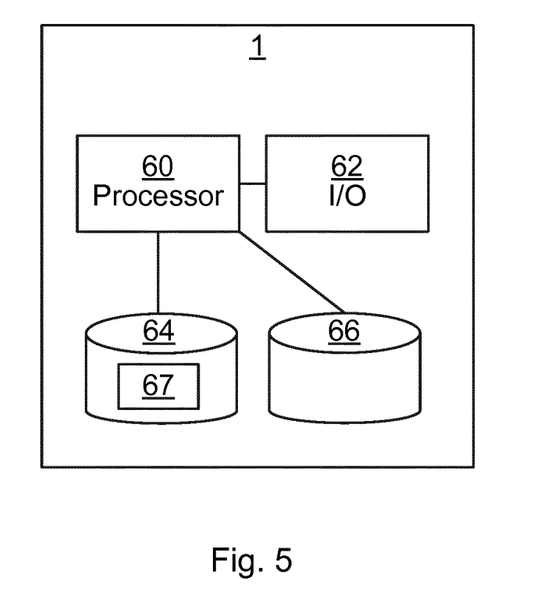
FIG. 5 is a schematic diagram illustrating components of the motor controller, of FIG. 2.

FIG. 5 is a schematic diagram illustrating components of the motor controller 1, of FIG. 2. A processor 60 is provided using any combination of one or more of a suitable microcontroller, CPU, digital signal processor (DSP), etc., capable of executing software instructions 67 stored in a memory 64, which can thus be a computer program product. The processor 60 can be configured to execute the methods described with reference to FIG. 4 above.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 66 is also provided for reading and/or storing data during execution of software instructions in the processor 60. The data memory 66 can be any combination of read and write memory (RAM) and read only memory (ROM).

The motor controller 1 further comprises an I/O interface 62 for communicating with other external entities. Hence, the motor controller 62 comprises the motor output 21 and the motor input 22.

Figure 6:
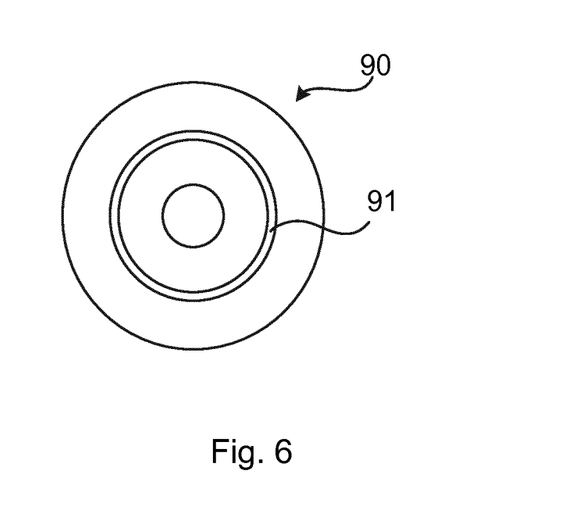
FIG. 6 shows one example of a computer program product comprising computer readable means.

FIG. 6 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 5. While the computer program 91 is here schematically shown as a track on the depicted optical disk, the computer program can be stored in any way which is suitable for the computer program product, such as a removable solid state memory, e.g. a Universal Serial Bus (USB) drive.

Here now follows a list of embodiments from another perspective, enumerated with roman numerals.

i. A motor controller configured to control movement of a motor to a mechanical end position, the motor controller comprising:
  a motor output configured to control an amount of energy being supplied to the motor;
  a motor input configured to measure a back electromotive force, EMF, voltage over the motor; and
  a control unit being configured to control the amount of energy being supplied on the motor output based on back EMF measurements from the motor input when the motor output is in a state of not supplying energy to the motor.

ii. The motor controller according to embodiment i, wherein the control unit is configured to detect the end position of the motor when the back EMF measurements reverse in polarity.

iii. The motor controller according to embodiment ii, wherein the control unit is configured to alternately add energy and measure back EMF until the end position is detected.

iv. The motor controller according to any one of the preceding embodiments, wherein the control unit is configured to estimate a speed of the motor based on the back EMF measurements.

v. The motor controller according to embodiment iv, wherein the control unit is configured to estimate the speed also based on a temperature.

vi. The motor controller according to embodiment iv or v, wherein the control unit is configured to supply more energy using the motor output when the detected speed is less than a reference speed.

vii. The motor controller according to any one of embodiments iv to vi, wherein the control unit is configured to supply less than a reference amount of energy using the motor output when the detected speed is greater than a reference speed.

viii. The motor controller according to any one of embodiments iv to vii, wherein the control unit is configured to estimate a motor position by integrating the speed over time.

ix. The motor controller according to any one of embodiments iv to viii, wherein the control unit is configured to detect an end position of the motor when the back EMF changes at a rate more than a first threshold amount.

x. The motor controller according to any one of the preceding embodiments, wherein the motor output is configured to control the amount of energy being supplied to the motor using pulses of electrical energy.

xi. The motor controller according to any one of the preceding embodiments, wherein the control unit is configured to detect that the motor is stuck when the back EMF is lower than a second threshold level.

xii. A motor assembly comprising the motor controller according to any one of the preceding embodiments and a motor controlled by the motor controller.

xiii. An electronic lock comprising the motor assembly according to embodiment xii.

xiv. A method for controlling movement of a motor to a mechanical end position, the method being performed in a motor controller and comprising the steps of:
providing signals on a motor output of the motor controller to control energy supplied to the motor;
measuring a back electromotive force, EMF, voltage over the motor; and
controlling the amount of energy being supplied on the motor output based on back EMF measurements from the motor input when the motor output is in a state of not supplying energy to the motor.

xv. A computer program for controlling movement of a motor to a mechanical end position, the computer program comprising computer program code which, when run on a motor controller causes the motor controller to:
provide signals on a motor output of the motor controller to control energy supplied to the motor;
measure a back electromotive force, EMF, voltage over the motor; and
control the amount of energy being supplied on the motor output based on back EMF measurements from the motor input when the motor output is in a state of not supplying energy to the motor.

xvi. A computer program product comprising a computer program according to embodiment xv and a computer readable means on which the computer program is stored.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A motor controller configured to control movement of a motor to a mechanical end position, the motor controller comprising:
a motor output configured to control an amount of energy being supplied to the motor;
a motor input configured to measure a back electromotive force, EMF, voltage over the motor; and
a control unit being configured to control the amount of energy being supplied on the motor output based on back EMF measurements from the motor input when the motor output is in a state of not supplying energy to the motor wherein the control unit is configured to detect an end position of the motor based on changes of back EMF measurements.

2. The motor controller according to claim 1, wherein the control unit is configured to detect the end position of the motor when the back EMF measurements reverse in polarity.

3. The motor controller according to claim 2, wherein the control unit is configured to alternately add energy and measure back EMF until the end position is detected.

4. The motor controller according to claim 1, wherein the control unit is configured to estimate a speed of the motor based on the back EMF measurements.

5. The motor controller to claim 4, wherein the control unit is configured to estimate the speed also based on a temperature.

6. The motor controller according to claim 4, wherein the control unit is configured to supply more energy using the motor output when the detected speed is less than a reference speed.

7. The motor controller according to claim 4, wherein the control unit is configured to supply less than a reference amount of energy using the motor output when the detected speed is greater than a reference speed.

8. The motor controller according to claim 4, wherein the control unit is configured to estimate a motor position by integrating the speed over time.

9. The motor controller according to claim 1 wherein the control unit is configured to detect an end position of the motor when the back EMF changes at a rate more than a first threshold amount.

10. The motor controller according to claim 1, wherein the motor output is configured to control the amount of energy being supplied to the motor using pulses of electrical energy.

11. The motor controller according to claim 1, wherein the control unit is configured to detect that the motor is stuck when the back EMF is lower than a second threshold level.

12. A motor assembly comprising the motor controller according to claim 1 and a motor controlled by the motor controller (1).

13. An electronic lock comprising the motor assembly according to claim 12.

14. A method for controlling movement of a motor to a mechanical end position, the method being performed in a motor controller and comprising the steps of:
providing signals on a motor output of the motor controller to control energy supplied to the motor;
measuring a back electromotive force, EMF, voltage over the motor; and
controlling the amount of energy being supplied on the motor output based on back EMF measurements from the motor input when the motor output is in a state of not supplying energy to the motor, which comprises detecting an end position of the motor based on changes of back EMF measurements.

15. A computer program for controlling movement of a motor to a mechanical end position, the computer program comprising computer program code which, when run on a motor controller causes the motor controller to:
provide signals on a motor output of the motor controller to control energy supplied to the motor;
measure a back electromotive force, EMF, voltage over the motor; and
control the amount of energy being supplied on the motor output based on back EMF measurements from the motor input when the motor output is in a state of not supplying energy to the motor, which comprises detecting an end position of the motor based on changes of back EMF measurements.

16. A computer program product comprising a computer program according to claim 15 and a computer readable means on which the computer program is stored.

\* \* \* \* \*